(12) United States Patent
Eriksson et al.

(10) Patent No.: US 12,228,799 B2
(45) Date of Patent: Feb. 18, 2025

(54) SINGLE UNIT COMPRISING ELECTRONICS FOR SMART GLASSES

(71) Applicant: Skugga Technology AB, Stockholm (SE)

(72) Inventors: Mikael Eriksson, Hägersten (SE);
Daniel Eriksson, Stockholm (SE);
Jonas Eriksson, Huddinge (SE);
Fredrik Hanson, Stockholm (SE)

(73) Assignee: SKUGGA TECHNOLOGY AB, Stockholm (SE)

( * ) Notice: Subject to any disclaimer, the term of this patent is extended or adjusted under 35 U.S.C. 154(b) by 773 days.

(21) Appl. No.: 17/431,963

(22) PCT Filed: Feb. 20, 2020

(86) PCT No.: PCT/SE2020/050200
§ 371 (c)(1),
(2) Date: Aug. 18, 2021

(87) PCT Pub. No.: WO2020/171768
PCT Pub. Date: Aug. 27, 2020

(65) Prior Publication Data
US 2022/0113561 A1    Apr. 14, 2022

(30) Foreign Application Priority Data
Feb. 22, 2019 (SE) .................... 1930069-8

(51) Int. Cl.
*G02C 11/00* (2006.01)
*G02C 5/14* (2006.01)
*G02C 5/00* (2006.01)

(52) U.S. Cl.
CPC .............. *G02C 11/10* (2013.01); *G02C 5/143* (2013.01); *G02C 5/146* (2013.01); *G02C 5/008* (2013.01)

(58) Field of Classification Search
CPC ........ G02C 5/008; G02C 5/143; G02C 5/146; G02C 11/10; G02C 1/00; G02C 11/06;
(Continued)

(56) References Cited

U.S. PATENT DOCUMENTS 10,319,890 B2 *   6/2019   Tischler ............. H01L 25/0655
2012/0127423 A1   5/2012   Blum
(Continued)

FOREIGN PATENT DOCUMENTS

EP    3305190 A1    4/2018
TW    200921179 A   5/2009
(Continued)

OTHER PUBLICATIONS

International Search Report and Written Opinion from corresponding International Application No. PCT/SE2020/050200, Apr. 8, 2020, 9 pages.
Supplementary European Search Report from corresponding European Application No. 20758860, mailed on Mar. 3, 2022; 8 pages.

*Primary Examiner* — Jie Lei
(74) *Attorney, Agent, or Firm* — Tucker Ellis LLP (57) ABSTRACT

A single unit in one piece, comprising components for smart glasses, to be positioned in glasses, the single unit comprising at least one cpu, at least one sensor and at least one battery provided on a pcb reaches, when positioned in glasses, at least from a first temple via a frame at least past a first lens positioned closest to the first temple in the frame up to a second lens positioned closest to a second temple, and preferably past also said second lens, and preferably further to said second temple. The single unit comprises at least one hinge, which, when positioned in glasses, will provide at least a hinge between the first temple and the frame, and the single unit is in one piece. A method of making a pair of smart acetate glasses comprising the single
(Continued)

unit. A method of exchanging electronics in a single unit comprising electronics.

11 Claims, 6 Drawing Sheets

(58) Field of Classification Search
CPC .......... G02C 11/00; G02C 5/001; G02C 5/02; G02C 5/22; G02C 5/14; G02B 27/0176; G02B 2027/0178; G02B 27/01; G02B 27/017
USPC .................. 351/41, 111, 121, 123, 124, 158; 381/327; 359/13, 629–633
See application file for complete search history.

(56) References Cited

U.S. PATENT DOCUMENTS

| | | | |
|---|---|---|---|
| 2016/0252727 A1* | 9/2016 | Mack | G02B 27/0172 345/8 |
| 2018/0049664 A1 | 2/2018 | Miyazaki | |
| 2019/0041666 A1* | 2/2019 | Abele | G02B 27/00 |

FOREIGN PATENT DOCUMENTS

| | | |
|---|---|---|
| WO | 2018169475 A1 | 9/2018 |
| WO | 2019011925 A1 | 1/2019 |

* cited by examiner

SINGLE UNIT COMPRISING ELECTRONICS FOR SMART GLASSES

The present invention provides a solution for making smart glasses and a single unit comprising electronics therefor.

The aim of producing smart glasses has been going on for some years but there has always been a lot of problems arising, such as how to provide a connection between frame and temples and how to fit different parts in to something that would work as a pair of smart glasses.

So far there has not been a solution how to provide a possibility to make a pair of glasses into smart glasses with a method making it possible for general producers of glasses to produce smart glasses.

SUMMARY

The aim of the present invention is to provide a possibility to do so.

A first problem was to understand the requirements and limitations of general producers of glasses.

According to a first aspect of the present invention a single unit in one piece is provided. The single unit comprises components for making up smart glasses and is to be positioned in a pair of glasses. The single unit comprises at least one central processing unit (cpu), at least one sensor and at least one battery provided on a printed circuit board (pcb). The single unit reaches, when positioned in a pair of glasses, at least from a first temple via a frame at least past a first lens positioned closest to the first temple in the frame up to a second lens positioned closest to a second temple, and preferably past also said second lens, and preferably further into said second temple.

The single unit comprises at least one hinge, which, when positioned in a pair of glasses, will provide at least a hinge between the first temple and the frame, and the single unit is in one piece.

The advantage is that all the components needed for making up a pair of smart glasses are provided in a single unit, in one piece. This simplifies the production of smart glasses significantly. By means of this hinge the pair of glasses will be possible to have in a use position when the temples are directed transversally to the frame and in a store position where the temples will be directed more or less parallel to the frame. In case the single unit reaches between the first temple via the frame to the second temple two hinges are provided between respective temple and the frame. Preferably, the hinges are of the type previously shown in WO 2018/084772 by the same proprietor, which minimises any mechanical wear of any connecting portions, for example electrical or optical cables.

According to an embodiment the printed circuit board, pcb, is in one piece.

According to an embodiment at least one encapsulated electronic part is to be positioned in at least one of the temples, wherein said at least one encapsulated electronic part is water and dust proof. In general production of glasses, the production site is not very clean and further when the smart glasses are to be used it is also an advantage to have the electronical components encapsulated.

According to an embodiment the single unit is positionable in a frame and at least one of the temples, making up smart glasses.

According to an embodiment the single unit is provided in a pair of glasses by moulding, injection moulding, or provided in at least one recess in the frame and in at least one of the temples.

According to an embodiment the single unit is provided with at least an elastic lip or cover which will fit in a form fitting provided in said recesses of the pair of glasses. Other ways of attaching the single unit in the recesses are, for example, heating the material around the recesses, using adhesive, form fitting, riveting or screwing, or a mix of technics.

According to a second aspect of the present invention a method of making a pair of smart acetate glasses comprising a single unit in one piece is provided. Recesses are made in the frame and in at least one temple corresponding to the size of the single unit. Thereafter the single unit is placed in the corresponding recesses and being attached. By means of this method it is possible to produce glasses of any design and making them into smart glasses in a simple and effective way, which would not interfere with the overall design of the glasses. It will provide the designer of the glasses with designer freedom. For example, the attachment can be provided by means of melting the acetate in order to attach the single unit comprising electronics. Other ways of attaching the single unit in the recesses are, for example, using adhesive, riveting or screwing.

According to a third aspect of the present invention a pair of smart glasses comprising a single unit in one piece according to any one of the preceding embodiments.

According to a fourth aspect of the present invention a method of exchanging electronics in a single unit comprising electronics provided in a pair of glasses is provided. A hard shell having form fitting keeps an inner portion comprising the electronics embedded in elastic material in place in the hard shell, and the hard shell is provided in a pair of glasses at the same time as the electronics in the single unit may be taken out and be replaced.

SHORT DESCRIPTION OF THE DRAWINGS

The present invention will now be described in detail under referral to the enclosed drawings, in which.

DETAILED DESCRIPTION OF EMBODIMENTS OF THE INVENTION

Figure 1:
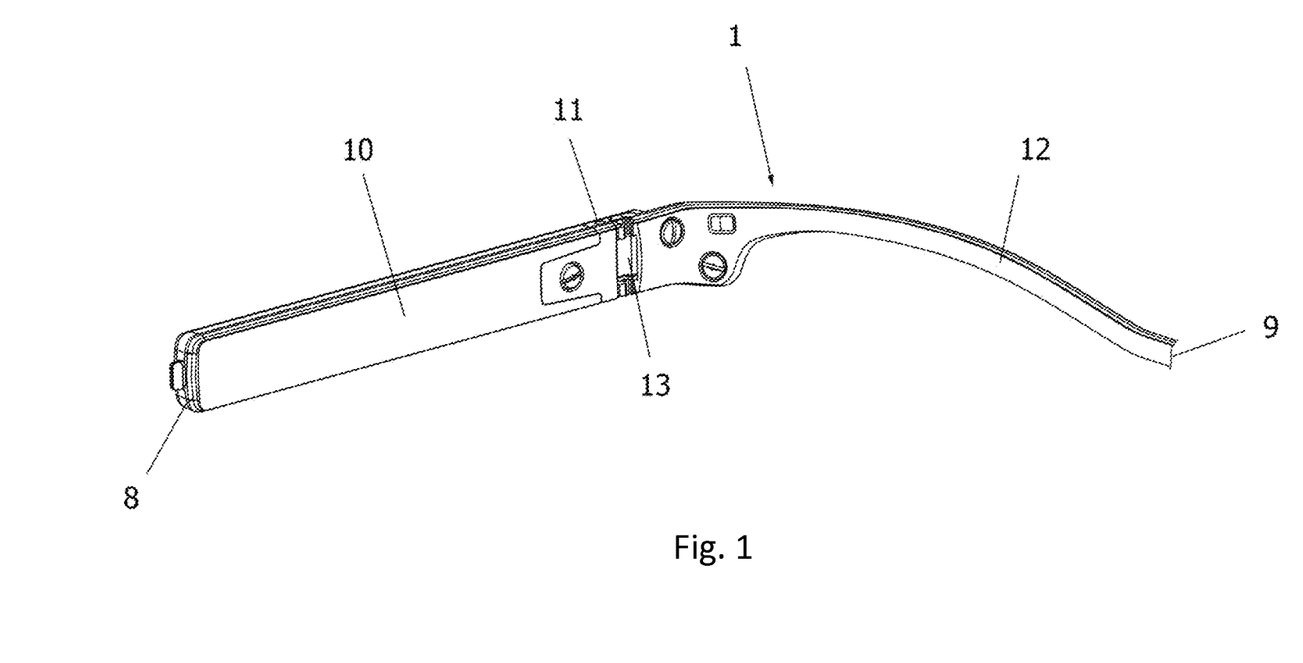
FIG. 1 shows an embodiment of a single unit in one piece from an inside view.

In FIG. 1 an embodiment of a single unit in one piece comprising electronics 1 according to the present invention is shown. The single unit 1 is in one piece. The single unit 1 comprises components for making up smart glasses and is to be positioned in a pair of glasses 2, see FIG. 4. The single unit 1 comprises at least one central processing unit (cpu), at least one sensor and at least one battery provided on a printed circuit board (pcb). Preferably, more sensors, a possible charging socket, such as a micro usb contact, possibly a switch and so on, may be provided in the single unit 1.

The single unit 1 in FIG. 1 has a first end 8 and a portion 10, which preferably is an encapsulated portion 10 comprising electronical components. Said encapsulated electronic portion is water and dust proof. Further the single unit 1 has a bridge portion 12, preferably more or less directed transversally from the first portion 10. It is preferred that the single unit 1 comprises a hinge 11, which is provided between the first portion 10, in the shown case the encapsulated electronics portion 10, and the bridge portion 12 of the single unit 1.

Figure 4:
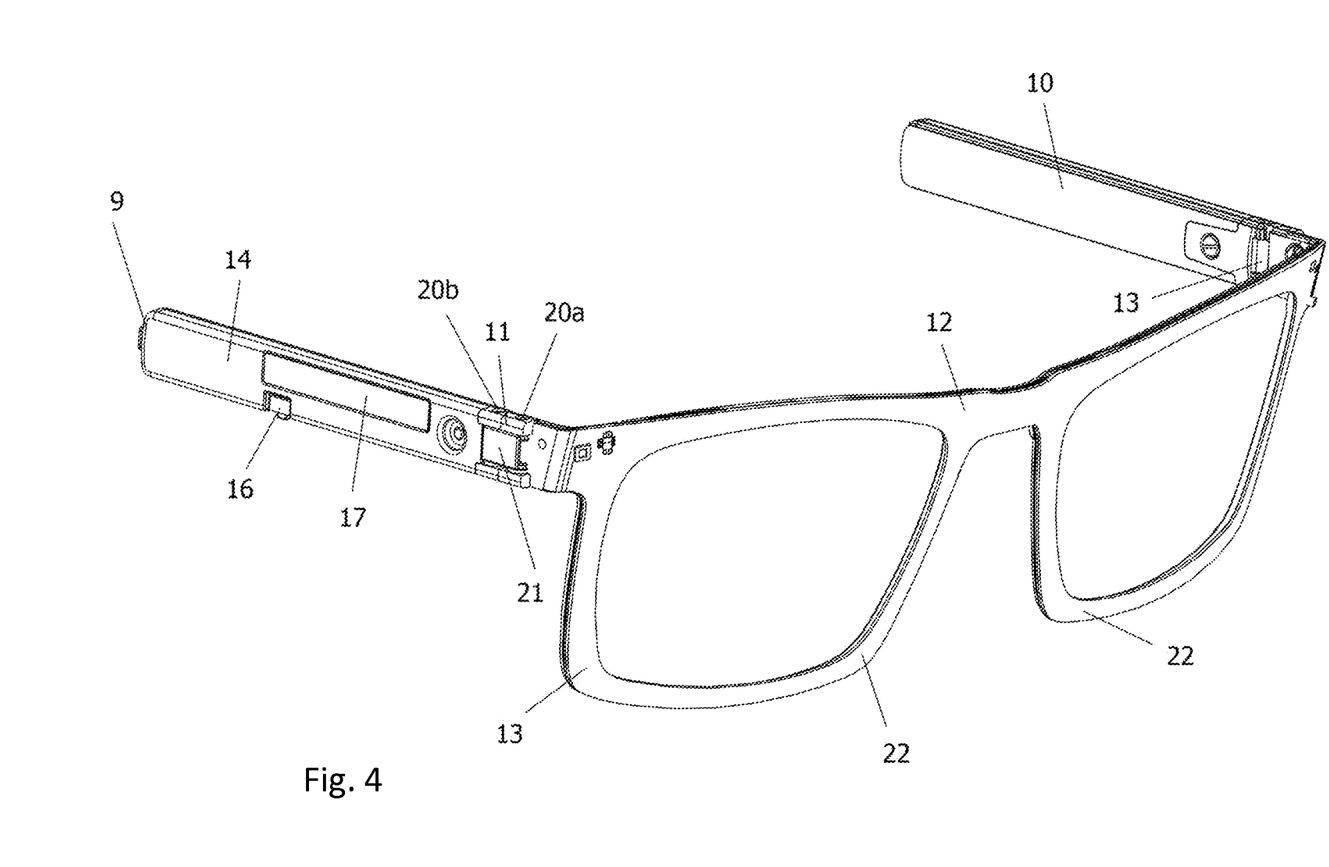
FIG. 4 shows an embodiment of the single unit in one piece suitable for inductive charging.

When positioned in a pair of glasses 2, the single unit 1 reaches with its first end 8 and first portion 10, at least from a first temple 3 up to a frame 4, where the bridge portion 12 reaches past a first lens 5 positioned closest to the first temple 3 in the frame 4 at least up to a second lens 6, positioned closest to a second temple 7, with a second end 9 of the unit 1, cf FIG. 4.

In the shown embodiment of FIG. 1 the pcb 13 is made in one piece reaching through also the hinge 11. Preferably the hinge 1 is of the type shown in WO 2018/084772 (incorporated hereby) by the same proprietor, which minimises any mechanical wear of any connecting portion, for example the pcb, electrical or optical cables. The hinge 11 may have two axis connections, a first axis connection 20a positioned closest to the frame 4 and a second axis connection 20b positioned closest to the temple 3, and therebetween at least one central part 21 is arranged to let the at least one cable, pcb 13 or wire follow a thought neutral bending plane through the hinge 11, see FIG. 2.

Figure 2:
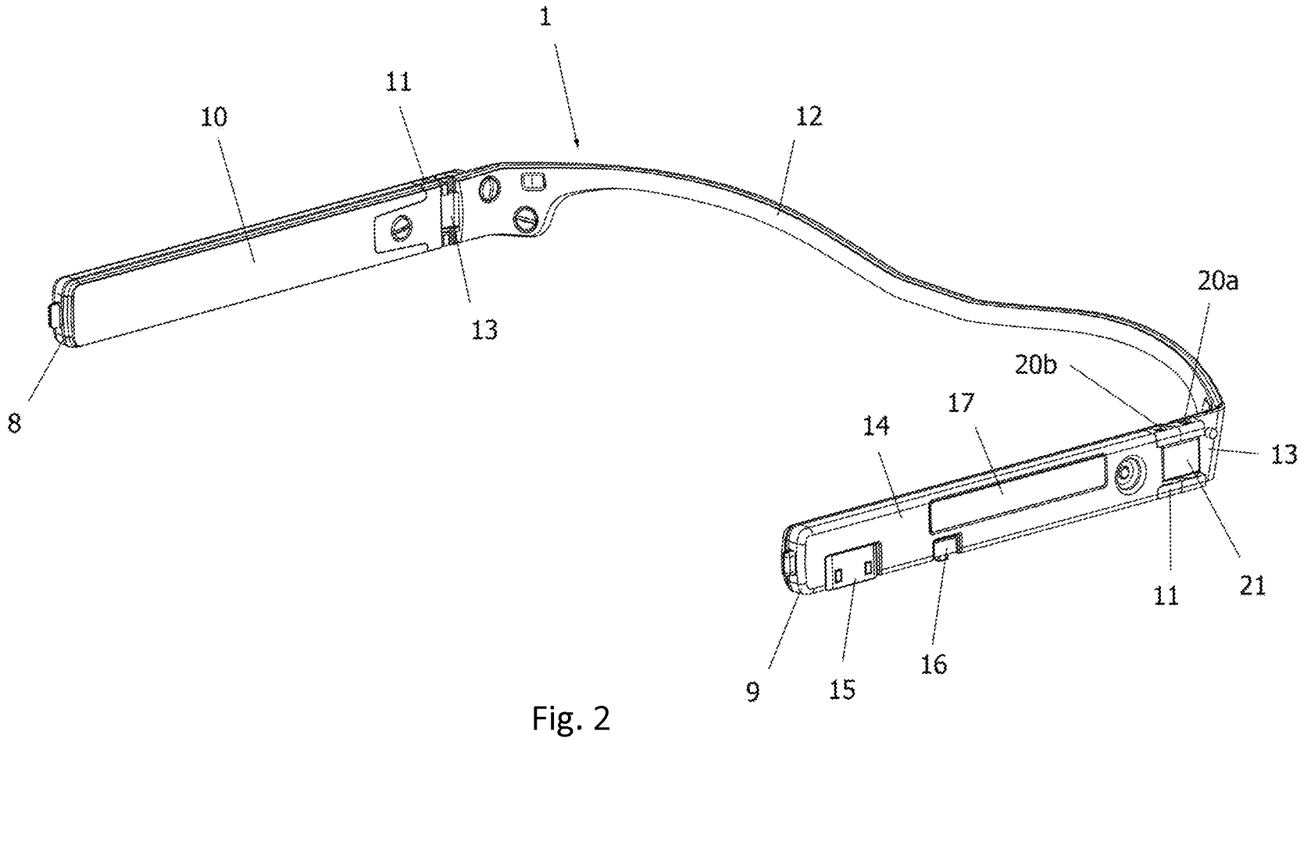
FIG. 2 shows an alternative embodiment of a single unit in one piece from an inside view.

In FIG. 2 a further embodiment of the single unit 1 according to the present invention is shown. Also, this single unit 1 is in one piece and comprises components for making up smart glasses and is to be positioned in a pair of glasses 2, see FIG. 4.

The single unit 1 in FIG. 2 has a first end 8 and a portion 10, which preferably is an encapsulated portion 10 comprising electronical components. Said encapsulated electronic portion 10 is water and dust proof. Further the single unit 1 has a bridge portion 12, preferably more or less directed transversally from the first portion 10. A second portion 14, also this portion is preferably encapsulated, is directed more or less transversally out from the bridge portion 14, parallel with the first portion 10.

It is preferred that the single unit 1 comprises a first hinge 11, which is provided between the first portion 10 and the bridge portion 12 of the single unit 1, and a second hinge 11, which is provided between the bridge portion 12 and the second portion 14 of the single unit 1.

When positioned in a pair of glasses 2, the single unit 1 reaches with its first end 8 and first portion 10, from the first temple 3 up to the frame 4, where the bridge portion 12 reaches past the second lens 6, positioned closest to the second temple 7, and the second portion 14 reaches out into the second temple 7 with a second end 9 of the unit 1, cf FIG. 4.

The single unit 1 comprises at least one central processing unit (cpu), at least one sensor and at least one battery provided on a printed circuit board (pcb). Preferably, more sensors, a charging socket, such as a micro usb or usb C contact, possibly a switch and so on, may be provided in the single unit 1. The different electronical components may be spread out in the two, first and second portions 10, 14, respectively.

According to one embodiment on of the portion may comprise a battery and the other may comprise most of the electronics, including the cpu. In the embodiment shown in FIG. 2 a micro usb contact 15 for the charging of the single unit 1 is provided in the second portion 14, near the second end 9. Further, a switch 16 is shown in the second portion 14. At least one opening 17 may be present in the vicinity of at least one sensor arranged within the first 10 or second portion 14.

Figure 3:
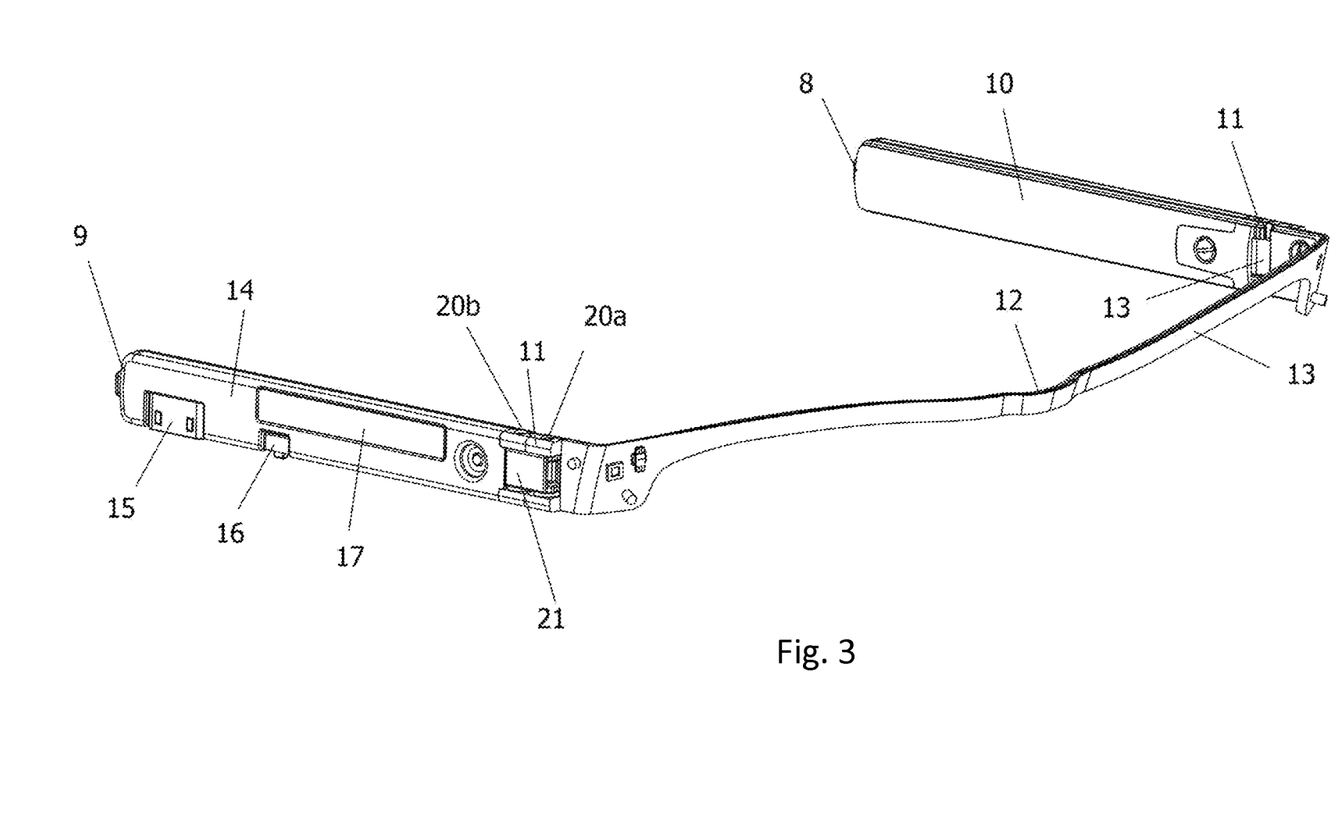
FIG. 3 shows the alternative embodiment of a single unit in one piece from an outside view.

In FIG. 3 the embodiment of FIG. 2 is shown in the opposite direction. In this view the pcb 13 is shown along the whole bridge portion 12 and also through the first hinge 11 between the bridge portion 12 and the first portion 10. Obviously, it is possible to arrange the pcb in other ways, such as on the other side of the bridge portion 12 or therein.

Also in the shown embodiment of FIG. 3 the pcb 13 is preferably made in one piece reaching through the hinges 11. Preferably the hinges 11 are of the type shown in WO 2018/084772 by the same proprietor, which minimises any mechanical wear of any connecting portion, for example the pcb, electrical or optical cables.

It I also conceivable to have smart glasses which is chargeable, specifically the at least one battery, by means of inductive charging where the single unit comprising electronics 1 also comprises at least a coil 22 provided around at least around one lens 5. In FIG. 4 an embodiment is shown having a coil surrounding two lenses. This technology, which has been incorporated into the embodiment in FIG. 4 has been patented by the proprietor and more details can be found in WO 2018/169475 (hereby incorporated).

The coil could be provided by a wire or be a printed circuit in a structure, such as the pcb 13 shown in FIG. 4. If the wire is round profile steel or copper wire it will form a substantial structural stability element for the glasses. If the coil 22 is a printed circuit the pcb 13 may have portions encircling at least one lens 5. Preferably printed circuit is multilayer circuit. Depending on which type of substrate the printed circuit is printed on, it can be flexible or stiff.

Figure 5:
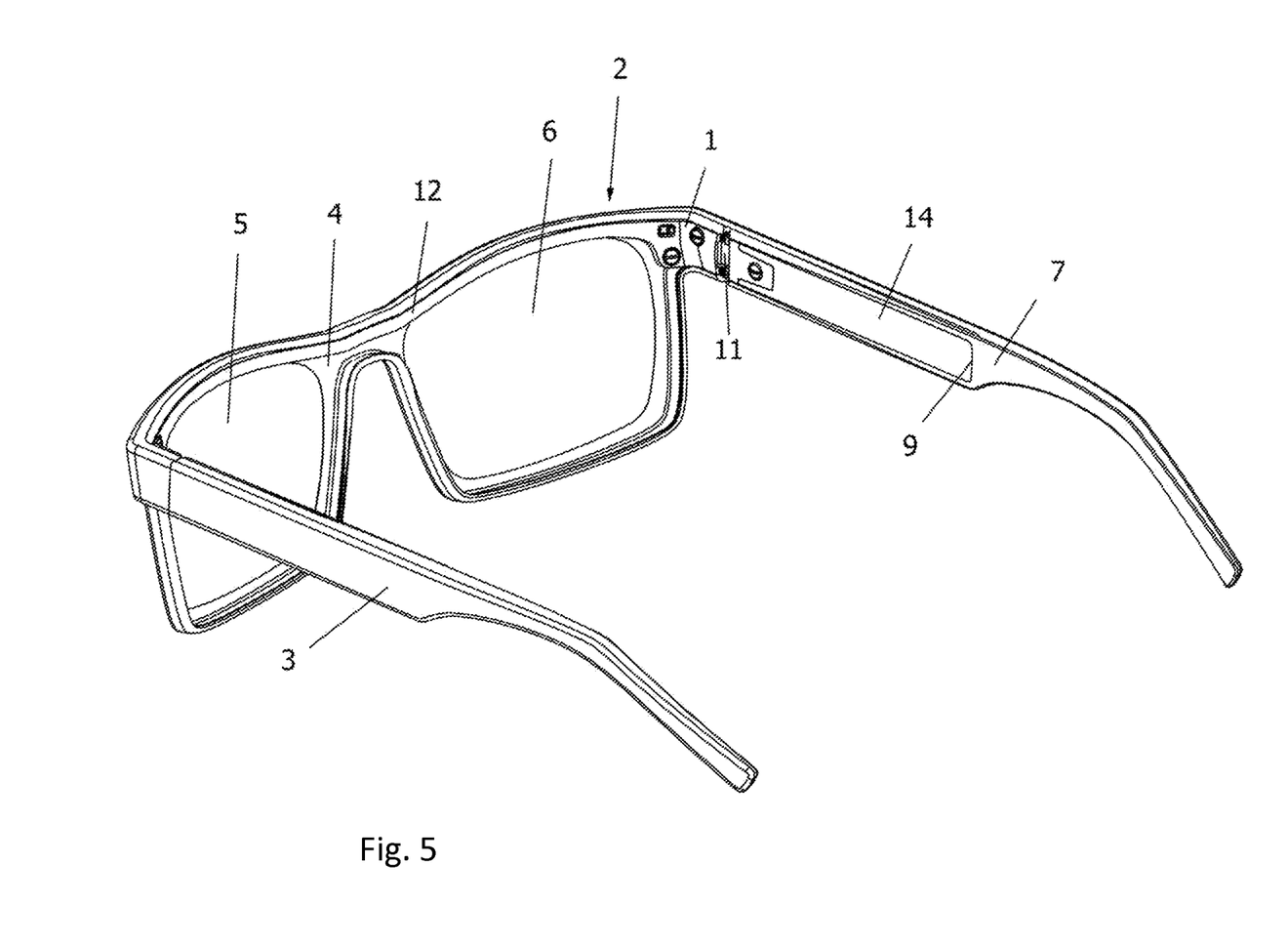
FIG. 5 shows the alternative embodiment of a single unit in one piece of FIG. 3 provided in a pair of glasses from an inside view.

In FIG. 5 a single unit comprising electronics 1 is positioned in a pair of glasses 2. The single unit 1 can be provided in the glasses 2 by moulding or injection moulding by placing the single unit 1 in a mould before adding the polymer. According to another embodiment the frame 4 at least partly and, in this embodiment, both of the temples 3, 7 are provided with recesses, which preferably correspond more or less to the size of the single unit 1, so that the single unit 1 can be positioned in the recesses.

The single unit 1 may be attached in the pair of glasses by means of heating the material around the recesses so that the material fuses around the single unit, using adhesive, form fitting, riveting or screwing, or it is also possible to use one or more of the exemplified technics.

Figure 6:
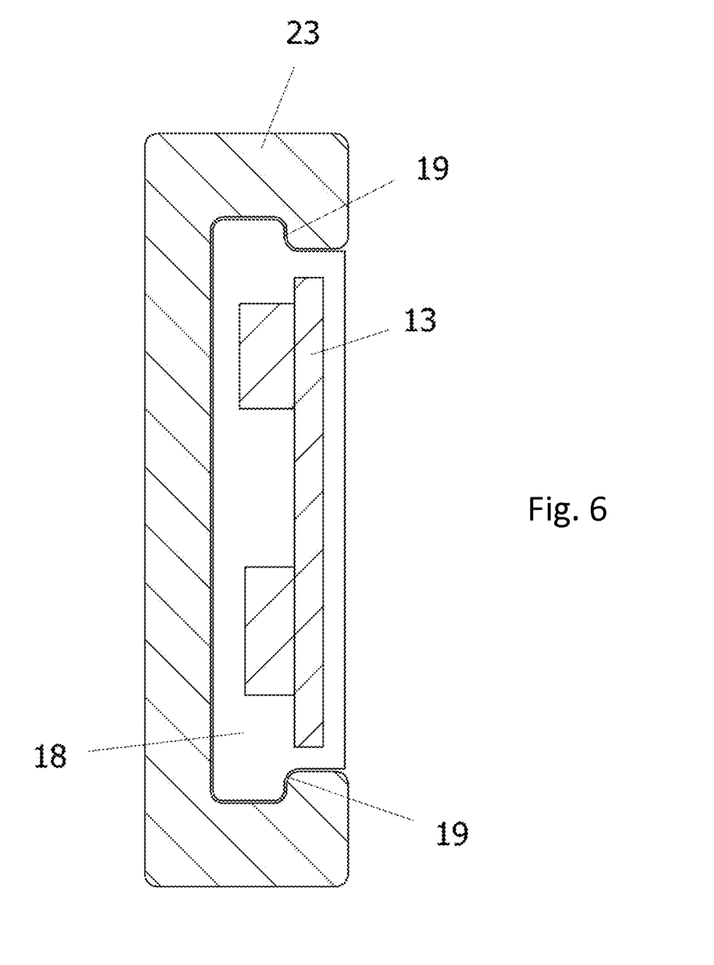
FIG. 6 shows an embodiment of a single unit made up with a hard shell and an elastic material embedding the electronics in a cross-sectional view.

An embodiment of the single unit comprising electronics 1 is shown in a cross sectional view of the portion 1 to be positioned in a temple, see FIG. 6. A hard cover 23 comprises a form fitting 19, and an elastic cover or embedding 18 comprising the electronics, such as the pcb 13 will fit in inside the form fitting 19, for example an undercut shape.

Thus, the embedded electronics of the single unit 1 will stay put in the recess but will also be possible to take out, for example if updated electronics is available, and a wearer would like to keep the pair of glasses but have the updated single unit 1 it will possible to exchange the electronics of the single units 1. Thus, the single unit 1 comprising the electronics embedded in elastic material kept inside the hard shell 23 of the single unit will be provided and sold in one piece to eye glasses manufacturers but with the advantage of an easy exchange in case an update of the electronics would be desirable.

As been described above many ways of incorporating the single unit 1 is possible. It is also conceivable to use different techniques for different parts, if for example the temples are of acetate and the frame of metal. In such a case it could be possible to make recesses in the temples for the first 10 and second portion 14 and then attach the bridge portion to the frame by means of screwing or gluing.

The single unit comprising electronics 1 could comprise supporting metal or be more flexible or be partly inflexible and partly flexible.

The invention claimed is:

1. A single unit in one piece comprising components for making up smart glasses, the single unit configured for positioning in a pair of glasses, the single unit in one piece comprises:
    electronics comprising a printed circuit board (PCB) in one piece and each of at least one central processing unit (CPU), at least one sensor, and at least one battery, the at least one CPU, the at least one sensor, and the at least one battery each provided on the PCB, wherein the single unit and the PCB reach at least from a first temple via a frame at least past a first lens positioned closest to the first temple in the frame up to a second lens positioned closest to a second temple,
    at least a hinge positionable in the pair of glasses to hindgedly connect the first temple and the frame; and
    elastic material in which the electronics are embedded and wherein the elastic material is shaped to be received in a form fitting of a hard shell, the hard shell being configured to connect to the frame, and wherein the form fitting has a shape and the elastic material has a resiliency so that the elastic material and embedded electronics are removable from the hard shell and replaceable with a different electronics unit that is embedded in respective elastic material.

2. The single unit according to claim 1, wherein two hinges are provided respectively between the first and second temples and the frame.

3. The single unit according to claim 1, wherein the encapsulated electronics are configured for positioning in at least one of the temples, and wherein the encapsulated electronics are water and dust proof.

4. The single unit according to claim 1, wherein the single unit is positionable in the frame and at least one of the temples, making up smart glasses.

5. The single unit according to claim 1, wherein the single unit is provided in the pair of glasses by moulding, injection moulding, or provided in at least one recess in the frame and in at least one of the temples.

6. The single unit according to claim 1, wherein the single unit is attached in the pair of glasses by means of heating material of the pair of glasses around a recesses in the pair of glasses in which the single unit is placed.

7. A pair of smart glasses comprising a single unit in one piece according to claim 1.

8. A method of making a pair of smart acetate glasses comprising a single unit in one piece according to claim 1, comprising the steps of making recesses in the frame and in at least one temple corresponding to the size of the single unit in one piece, placing the single unit in one piece in the corresponding recesses and attaching it.

9. The method according to claim 8, comprising the step of attaching by means of melting the acetate in order to attach the single unit.

10. A method of exchanging electronics in a single unit in one piece, according to claim 1, comprising the steps of attaching a single unit in a pair of glasses, wherein the single unit has a hard shell, which is attached in the glasses, keeping an inner portion comprising the electronics embedded in elastic material in place in the hard shell by means of form fittings.

11. The single unit according to claim 1, wherein the single unit and the PCB reach past the second lens.

* * * * *